(12) United States Patent
Neumann et al.

(10) Patent No.: US 7,248,940 B2
(45) Date of Patent: Jul. 24, 2007

(54) METHOD AND DEVICE FOR THE ROBOT-CONTROLLED CUTTING OF WORKPIECES TO BE ASSEMBLED BY MEANS OF LASER RADIATION

(75) Inventors: Günter Neumann, Aachen (DE); Friedrich Behr, Aachen (DE); Axel Fischer, Obernburg (DE); Eberhard Kroth, Obernburg (DE); Stefan Seiler, Obernburg (DE); Franz Som, Lützelbach (DE); Rolf P. Maisch, Boppelsen (CH); Wolfgang Zesch, Zürich (CH)

(73) Assignees: Thyssen Laser-Technik GmbH, Aachen (DE); Reis GmbH & Co., Maschinenfabrik, Obernburg (DE)

( * ) Notice: Subject to any disclaimer, the term of this patent is extended or adjusted under 35 U.S.C. 154(b) by 38 days.

(21) Appl. No.: 10/479,047

(22) PCT Filed: May 16, 2002

(86) PCT No.: PCT/EP02/05371

§ 371 (c)(1),
(2), (4) Date: Jun. 15, 2005

(87) PCT Pub. No.: WO02/098597

PCT Pub. Date: Dec. 12, 2002

(65) Prior Publication Data

US 2005/0237019 A1  Oct. 27, 2005

(51) Int. Cl.
*G06F 19/00* (2006.01)
*B23K 26/02* (2006.01)

(52) U.S. Cl. .......... 700/166; 700/170; 219/121.67; 219/121.6

(58) Field of Classification Search ........... 700/166, 700/170; 219/121.67, 121.6
See application file for complete search history.

(56) References Cited

U.S. PATENT DOCUMENTS

| | | | |
|---|---|---|---|
| 4,411,410 A | | 10/1983 | Sumner |
| 4,772,772 A | * | 9/1988 | Juptner et al. ......... 219/121.83 |
| 6,128,546 A | * | 10/2000 | Basista et al. .............. 700/166 |
| 6,284,999 B1 | * | 9/2001 | Virtanen et al. ....... 219/121.67 |
| 6,528,762 B2 | * | 3/2003 | Mayer .................... 219/121.83 |
| 6,563,083 B2 | * | 5/2003 | Behr et al. ............. 219/121.78 |
| 6,795,482 B2 | * | 9/2004 | Gernhart et al. ............ 372/109 |
| 2004/0159642 A1 | * | 8/2004 | Nepomuceno et al. . 219/121.69 |

FOREIGN PATENT DOCUMENTS

| | | |
|---|---|---|
| EP | 0 901 875 A1 | 3/1999 |
| GB | 1 393 516 | 7/1975 |

* cited by examiner

Primary Examiner—Michael D. Masinick
(74) Attorney, Agent, or Firm—Gudrun E. Huckett

(57) ABSTRACT

In a method for robot-controlled cutting of workpieces to be joined by laser radiation, a first workpiece is arranged in vicinity of a second workpiece in a first position. A laser is focused onto the first workpiece. A contour of the first workpiece is cut with the laser beam; this contour is to be assembled and joined with the second workpiece. During cutting, a first spacing of a focal point of the laser beam from the second workpiece is repeatedly determined in a distance direction that is identically oriented during cutting and is adjusted to a direction of assembling the first and second workpieces. During cutting, a second spacing of a processing point of the laser beam from the second workpiece is maintained at a constant value.

34 Claims, 4 Drawing Sheets

METHOD AND DEVICE FOR THE ROBOT-CONTROLLED CUTTING OF WORKPIECES TO BE ASSEMBLED BY MEANS OF LASER RADIATION

BACKGROUND OF THE INVENTION

The invention relates to a method for robot-controlled cutting of workpieces to be joined by means of laser radiation that is being focused onto a first workpiece whose cut contour is assembled and joined with a second workpiece.

Such a method is known in general. It is carried out conventionally with buckling arm robots that, based on their low adjusting frequency of approximately 10 Hz for all axes, have significant impression for cutting and welding. In addition, there are impressions as a result of the mechanical manufacture of the robot parts, of the employed encoders, and as a result of the machine-internal coordinate system that deviates from an ideal coordinate system. Moreover, dynamically caused impressions of the focal point position are present. Depending on the gear configuration and amount of teach points, a path repetition precision of only approximately +/−0.1 to +/−0.4 mm in any of the three coordinate directions is achieved for approximately 5 m/min. The resulting precision range is +/−0.1×sheet metal thickness. It would be necessary to bring the precision for cutting sheet metal by means of robots to a precision of +/−0.05 ×sheet metal thickness in order to prevent a seam collapse for welding without welding additives. Moreover, radii of less than 50 mm cannot be welded with the known method because the robot control correction is too slow.

Moreover, it is known (IP 901 875 A1) to control a laser beam by means of one or several moved mirrors on a robot hand such that this robot hand is maintained in a predetermined position during machining. The focus can then be positioned with higher precision on the workpiece in comparison to the robot control. The processing width to be achieved of approximately 50 mm is however completely unsatisfactory, in particular, for manufacturing tube frame structures in the automobile construction sector.

SUMMARY OF THE INVENTION

It is an object of the invention to provide a method having the aforementioned method steps that enables, by means of a single robot, to cut the sheet metal edges in a range of +/−0.05× sheet metal thickness as a path repetition precision so that welding can be carried out subsequently without problems, in particular, without seam collapse. The contour should have even very small radii of less than 50 mm up to sharp-edged corners.

The aforementioned object is solved in that the first workpiece is arranged in the vicinity of the second workpiece in a position in which position the contour is produced, in that, during cutting of the contour of the first workpiece. The spacing of the focal point from the second workpiece is repeatedly determined in a distance direction that is identically aligned during cutting and is adjusted to a direction of assembling the two workpieces, and in that a spacing ) of a processing point from the second workpiece is maintained at a constant value during cutting.

For the method, it is supposed that the workpieces to be joined, after cutting at least the first workpieces, are to be assembled in a certain direction and must fit in this direction. For the method, it is therefore important that the direction of joining of the two workpieces must be the basis for carrying out cutting of the first workpiece with a precise contour. At any location of the cutting contour of the first workpiece, the spacing of the focal point from the second workpiece is determined with identically oriented distance direction that is matched to the direction of joining of the two workpieces, and the position of a processing point on the first workpiece is controlled such that its spacing from the second workpiece during cutting is maintained at a constant value. In this case, in particular, in the case of a buckling arm robot, a sufficiently precise reference for its control or for controlling the laser cutting beam can be achieved. A buckling arm robot could achieve by means of a special gear system path precisions with 0.4 mm deviation in all three coordinate directions for a spacing of the focal point from the first axis of rotation of approximately 1,000 mm. However, this corresponds in the incidence direction, that is a reference parameter for z and g, to an angle range of only +/−0.023 angular degree.

In a method with the method steps according to the characterizing portion of claim 1, path impressions of the robot and also workpiece impressions can be compensated simultaneously. It is possible to produce three-dimensional contour cuts, including a bevel angle, that matches primarily in the saddle area the curvature of the second workpiece, in order to achieve improved joining. Joining can be realized by welding, soldering, heat fusing or by a curing adhesive. In particular, welding is possible where seam collapse is prevented. In the seam area outside of a saddle area, there is always material available during welding, as a result of melting of the cutting edge, so that preparation must not be so exact here as in the saddle area. With the method, in the first workpiece a cut can be achieved whose joint width should be a maximum of 0.1×sheet metal thickness. The impressions that occur in this connection can be kept to be without effect on the seam formation in that the components during joining are pressed against one another so that in this way by means of elastic shaping an even more precise positioning is enabled.

Moreover, it is important to carry out the method such that during cutting of the contour of the first workpiece in addition to the distance determination of the focal point from the second workpiece a repeated measurement of a spacing of an element of a processing optics from the first workpiece is realized and that this spacing is maintained at a constant value during cutting. As a result of this, any change of the distance of the focal point from the first workpiece results in controlling this spacing in the sense of maintaining its value constant. At the same time, however, the spacing of the focal point from the second workpiece is monitored continuously and the spacing of a processing point is maintained at a constant value so that a change of the spacing of the focal point from the first workpiece does not result in a contour of the first workpiece that does not match the second workpiece during joining of both workpieces.

It is advantageous to perform the method such that the spacing of the focal point from the second workpiece is measured directly and that the constant spacing of a processing point corresponding to the focal point is adjusted taking into consideration, as needed, the curvature of the first workpiece and/or of the second workpiece. The distance determination is carried out by direct measuring in this connection. It is possible to employ well-known measuring methods with which the desired precision can be achieved. For example, capacitive sensors can be used. However, they have errors when they are not positioned to face perpen dicularly the workpiece surface. Therefore, they should be used in connection with a corrective table in order to measure a correct spacing. It is therefore more advantageous to adjust the spacing of a processing point trailing the focal point in that the effectively present curvature of the first and/or of the second workpiece is taken into account.

This can be carried out such that the spacing of an element of a processing optics from the first workpiece is measured with at least one contactless sensor in an incidence direction of a laser beam and/or in that the spacing of the focal point from the second workpiece is measured with at least one contactless sensor. The direct measurement with contactless sensors prevents all disadvantages that result from a contact-based measurement. The contactless measurement is suitable in particular also for thin workpieces where deformation-caused measuring errors are to be expected in the case of a contacting measurement.

On the other hand, the contact-based measurement also has advantages, for example, a determination of spacings independent of curvatures of the workpiece can be carried out. It can therefore be advantageous to perform the method such that the spacings of the focal point from the second workpiece and/or of an element of a processing optics from the first workpiece is measured by tracing or roller sensor. Contact-based sensors require, however, in the measuring direction a longitudinal extension and, because of the contact pressures to be applied, can be used only in the case of workpieces having a great wall thickness.

In the case that workpiece curvatures are to be taken into account during measurement, it is advantageous to perform the method such that the distances of the focal point from the second workpiece and/or of an element of a processing optics from the first workpiece are determined by a measuring device based on at least three lights dots or a light strip, respectively, arranged all in one measuring plane, e.g. in the z'-z plane of FIGS. 2 and 3. The light of the lights dots or the light strip is reflected as a function of a curvature, and this is to be determined by the measuring device. Based on the measuring result, curvature circles can be calculated. Based on the calculated result, the spacing of a processing point corresponding to the focal point is to be adjusted taking into consideration the curvature that has been determined by means of the lights dots or the light strip.

The aforementioned method is carried out preferably such that the center between the light dots or of the light strip is aligned with the focal point as well as its foot point that is projected in the distance direction. This enables a more precise determination of the curvature, and the determination is independent of the direction.

When performing the method, it must be taken into account that processing radiation is emitted by the cutting location, for example, heat radiation. The method must therefore be carried out such that this radiation does not falsify the result. With regard to this, the method is expediently carried out such that the light dots and/or the light strip are generated by means of a measuring beam of a measuring laser, wherein the intensity of the measuring radiation surpasses that of the laser radiation and/or masking of a process radiation is carried out and in that the light reflected by the light dots or by the light strip is evaluated with regard to the curvature of the workpiece or both workpieces by means of a depth-of-field camera optics.

Buckling arm robots are slow as they have a control or regulating frequency of approximately 10 Hz. In order to achieve the desired precision, it is therefore expedient to carry out the method such that maintaining a constant distance value of the processing point from the second workpiece is realized in soft real time with more than 40 Hz or with more than 50 Hz when a displacement of a processing point of more than 28 µm in the distance direction occurs.

An improvement of the dimensional accuracy of the method can be achieved in that a processing point is placed onto the wall surface of the first workpiece facing away from the laser beam. When thus the subsequent processing point is positioned on the inner wall surface of the first workpiece, but the focus is on the front wall side facing the laser beam, it is ensured that the first workpiece, after displacement to the second workpiece, will still be contacting within the transition area and the overlap area even when the bevel angle of the cut edge of the first workpiece does not match the incline of the second workpiece, in particular, when a constant bevel angle of 20 to 40 angle degrees is cut.

The first workpiece is usually three-dimensional. Accordingly, the distance of an element of the processing optics from the first workpiece must be readjustable. However, with such a readjustment function, the spacing of the focal point from the second workpiece, i.e., in the distance direction, will change also. With respect to this, it is advantageous to carry out the method such that at least the sensor measuring the distance of the focal point in the distance direction is adjusted by parallelogram control wherein two parallel parallelogram arms are positionally secured parallel relative to the distance direction. By means of the parallelogram control, it is ensured that the distance direction is always adjusted in the direction of joining of the two workpieces. All conceivable distance directions are thus parallel to one another or an absolute dimension of the distance direction is achieved. Moreover, it is possible with the two parallel parallelogram arms to arrange a sensor, that measures in the distance direction, as closely as possible relative to the second workpiece; this is beneficial with regard to the precision of the measurement.

In a special way, the afore described method can be carried out such that a parallelogram control of two parallel parallelogram arms is provided, one extending in the incidence direction of the laser beam. In this way, the parallelogram control can be integrated in a compact way into the robot hand. For measuring the distance in the incidence direction of the laser beam, conventional constructions could be used. It is possible to pivot the parallelogram formed by the parallelogram arms about an axis, that is identical to the incidence direction of the laser beam, for the purpose of adjustment of the two workpieces in their joining area.

When cutting the first workpiece, it is to be achieved that its cut edge rests as gap-free as possible on the surface of the second workpiece. For this purpose, the method can be carried out such that the incidence direction of the laser beam is parallel to a tangential plane extending through a foot point of the focal point and/or forms a predetermined bevel angle at least in a saddle area of the workpiece. When the incidence direction of the laser beam is selected to be parallel to a tangential plane that extends through the foot point of the focal point, a cut edge of the first workpiece is obtained that is arranged in this tangential plane when the two workpieces are moved toward one another. In this way, an optimal adaptation of the first workpiece to the second one is provided. When cutting is carried out with a predetermined bevel angle, a special configuration of the cut edge of the first workpiece can be achieved, for example, an open gap positioned between this cut edge and the second workpiece for introducing a joining material.

Sufficient precision for configuring the cut edge of the first workpiece can be achieved when the incidence direction of the laser beam is adjusted with a precision of +/−2°.

The precision of the configuration of the cut edge of the first workpiece can be positively affected also in that the incidence direction of the laser beam during cutting is always perpendicular to a line of interception of an x-y plane with a tangential plane extending through the focal point. In this way, it is achieved that always the shortest workpiece thickness is cut.

In order to keep the constructive expenditure as small as possible when performing the method, it is expedient when the constant spacing of the processing point from the second workpiece is achieved by means of a control of an optical element within the beam path of the laser radiation. Since in this way only minimal masses must be moved, high precision with minimal adjusting times result. The measuring and control frequencies can be correspondingly high.

The invention relates also to a device for robot-controlled cutting of workpieces to be joined by means of laser radiation that is focused onto a first workpiece whose cut contour is to be assembled and joined with a second workpiece, in particular, for performing the above described method. In order to solve for such a device the above described precision problems, the device is characterized in that the processing point formed on the first workpiece has a spacing maintained constant relative to the second workpiece in a distance direction that is identically aligned during cutting and is adjusted to a direction (g) of assembling the two workpieces, and in that a spacing of the focal point is measurable during cutting with a sensor aligned in the distance direction. With these features, the above described advantages can be obtained. In particular, the path precision or path repetition precision mentioned above can be realized.

It is of particular importance to configure the device such that the sensor can be aligned by means of a guide bar parallelogram having a first arm pair that is aligned in accordance with the distance direction and having a second arm pair that is aligned in the incidence direction of a laser beam. By means of the guide bar parallelogram, the focal point or its corresponding processing point can be secured by a control and/or by computation or by a rigid guiding action at a constant spacing from the second workpiece in the distance direction in that the sensor is aligned by means of the guide bar parallelogram.

In order to be able to take into account the three-dimensional configurations of the first workpiece, the device can be configured such that on an upper parallelogram arm, that is aligned in the incidence direction of the laser beam, a sensor is arranged with which a spacing of an element of a processing optics from the first workpiece can be measured. It is possible in this way to keep the sensor that is oriented in the distance direction within the incidence direction of the laser beam without changing its spacing from the second workpiece even in the case of a spacing change of the first workpiece.

When the upper parallelogram arm is formed by the axis of rotation of a robot hand, on the one hand, a compact configuration is provided in the area of the robot hand and, at the same time, there is the possibility of pivoting the guide bar parallelogram formed by the pairs of arms by means of the axis of rotation of the robot hand about the longitudinal axis of this axis of rotation or about the axis of the incidence direction.

A further configuration of the device is characterized in that a lower parallelogram arm is arranged parallel to an axis of rotation of a robot hand and is fastened thereto in a pivotable and driveable way by means of pair of arms that is parallel to the distance direction. In this way, the device can be configured to be even more compact in the area of the robot hand and, at the same time, by means of the drive of the lower parallelogram arm, it is possible to keep the spacing of a sensor. that measures in the distance direction relative to the second workpiece. precisely in the distance direction and at +/−2° relative to the surface of the second workpiece.

The device can be characterized in that in the beam path of the laser beam an optical element is arranged with which the processing point is movable about a center position. In this way, the processing point is moveable in both directional components of the incidence direction; this is particularly advantageous when the first workpiece in the incidence direction has greater dimensional changes that must be controlled quickly.

In order to move the processing point, the device can be configured such that the optical element is a tilting mirror or a movable lens or is comprised of two prisms that can be rotated relative to one another. All of the aforementioned components are adjustable in a fast and precise way so that corresponding improvements in regard to the regulating and control frequency and thus in regard to the dimensional accuracy are obtained.

A compact and rigid configuration of the device in the area of the robot hand is achieved in particular when a distance adjusting range of the focal point to a processing point is +/−1.5 mm in a parallelogram plane. Under these conditions, it is possible in particular to employ very precise encoders for the adjustment of optical components as a fast axis for adjusting the processing point.

Moreover, it can be advantageous that for generating the laser radiation a laser having a beam quality of k 0.35 is present. The high beam quality ensures a narrow shape of the laser beam in the focal area with different spacings from the first workpiece in the incidence direction, this allows cutting without having to carry out a spacing correction, for example, by adjusting an optical element of a processing optics in the incidence direction.

In order to be able to carry out distance measurements in the incidence direction, the device can be configured such that a laser measuring beam extending coaxially to the laser beam and having a wavelength range of 500 to 1,000 nm is present. Within the aforementioned wavelength range, the laser measuring beam is able to penetrate the movable optical components provided for adjusting the laser beam without being affected by their momentary position in order to be focused at a location where a measurement is to be carried out.

When a sensor, arranged on the lower parallelogram arm, belongs to a measuring device operating with white light, significant precision can be achieved when measuring the spacing in the distance direction, for example, a precision of better than +/−10 μm.

It is advantageous to configure the device such that it forms the hand of a robot that is suspended from a linear additional axis. In this way, the manipulation range of the robot is significantly increased so that space frame constructions, i.e., latter-like truss constructions, can be processed that, as a result of their dimensions and arrangement, require multiple positioning capabilities of the robot hand or of the processing head.

BRIEF DESCRIPTION OF THE DRAWINGS

The invention will be explained with the aid of embodiments illustrated in the drawing. It is shown in.

DESCRIPTION OF PREFERRED EMBODIMENTS

Figure 4:
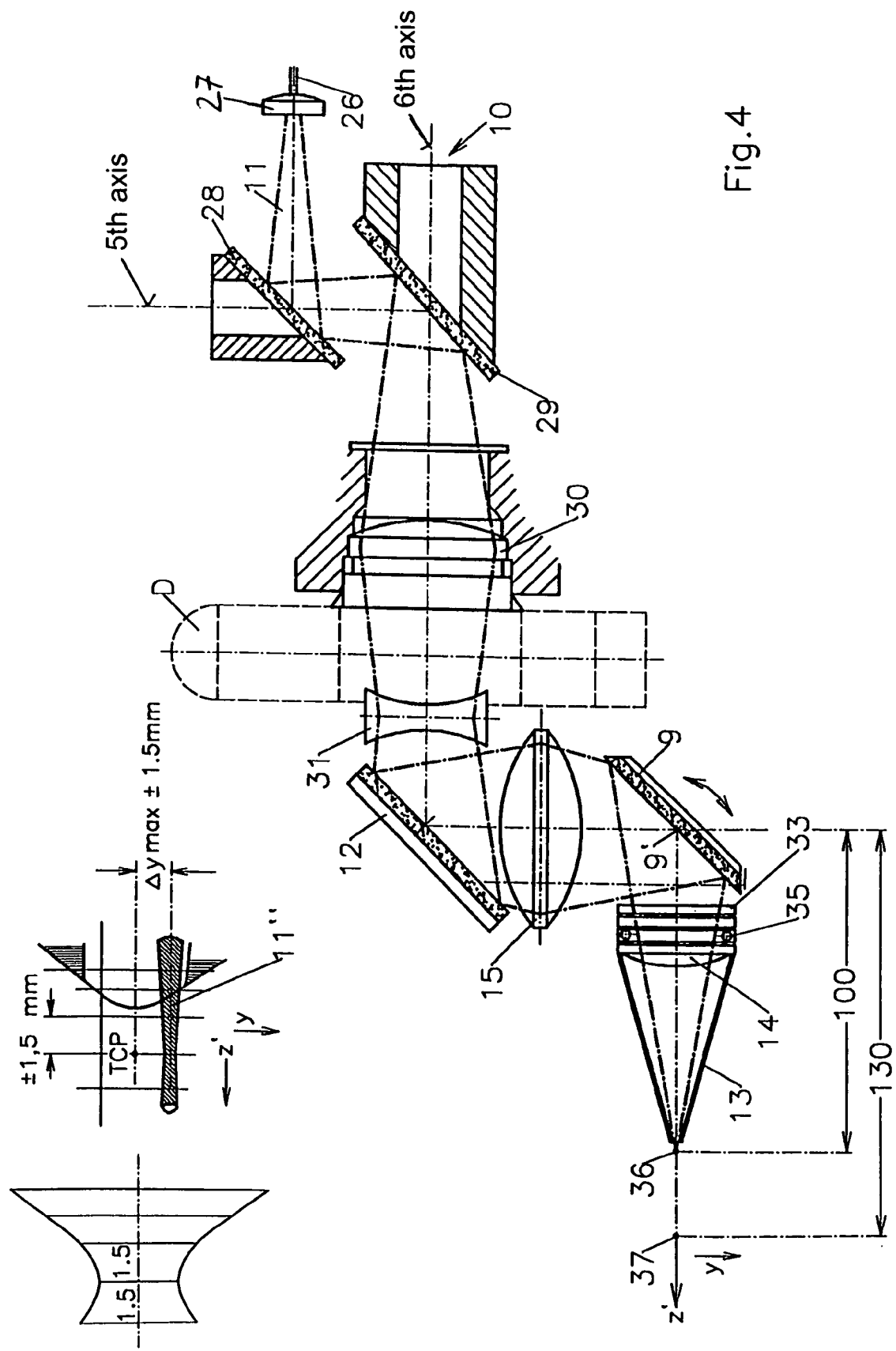
FIG. 4 a schematic sectional illustration of optically effective elements of a processing head or a robot hand.

In order to be able to perform robot-controlled cutting of workpieces, manipulation devices are required that are embodied as robots, for example, buckling arm robots. Such buckling arm robots are generally known and can be configured, for example, as a 6-axis robot. For example, a base axis is provided which is configured as an axis of rotation and is fastened at or on a support surface. A pivot axis can be connected to such an axis of rotation, i.e., a robot arm having at its other end an additional pivot axis for a rotary arm that forms a fourth robot axis and is provided at its end facing the workpiece with a robot hand carrying a machining head. The robot hand has a hand axis as a fifth axis of the robot whose components are schematically illustrated in FIG. 4. The fifth axis of the robot supports a further axis, the sixth axis, as indicated generally in FIG. 4 at 10. The fifth axis together with mirrors 28 and 29 is illustrated rotated about the sixth axis and rotated by 90° into the plane of the drawing.

A processing optics is provided in the robot hand whose components are illustrated in FIG. 4. Laser radiation 11 is supplied, for example, by means of a glass fiber conduit 26, for example, by means of a light guide fiber. The fiber coupling is configured such that the laser radiation of a diode-pumped solid-state laser is coupled into the buckling arm robot in the area of the third axis so as to have a beam quality that is suitable for cutting. This axis and the robot hand supported by this axis, together with a machining head or with the sixth, i.e, the axis of rotation 10, can be configured in accordance with IP-A-0 901 875 where the fiber coupling is disclosed in detail.

The laser radiation 11 coming from the glass fiber conduit reaches via a prestage collimator lens 27 two 90° mirrors 28, 29 and then a collimator lens 30 which causes tapering of the beam. The tapering beam reaches a dispersing lens 31 and from there is guided to a mirror 12 that is a plane mirror. The radiation reaches, coming from the mirror 12, a focusing lens 15. From the focusing lens 15, laser radiation 11 reaches, for example, a 90° tilting mirror that is tiltable in the direction of the illustrated double-headed arrow. The tilting function is, for example, +/−0.45°. The tilting axis 9' is arranged perpendicularly to the axis of the laser beam; it provides tilting in the y direction. The tilting mirror 9 allows the focused laser radiation to pass through a protective glass 33 and, transversely to a compressed air cross jet, into a cutting nozzle 13. The cutting nozzle 13 is a supersonic nozzle in the form of a slotted hole-shaped Laval nozzle that can be controlled in the y direction by means of the axis of rotation 10 in front of the tilting mirror 9. As a result of this, it can be achieved that pivoting of the tilting mirror 9 always causes the laser radiation 11 to exit unimpededly from the nozzle through the slotted hole of the nozzle 13. In the case of cutting, the target point TCP of the robot or of its coordinate system in the position 36 is spaced, for example, by 100 mm away from the center of the deflection mirror 9. The focal point TCP, or the tool center point TCP, is the reference or target point of the robot or its coordinate system. The focal point of the laser beam is positioned, when it is in the central position of its control range of +/−1.5 mm, on the TCP. After measurement and calculation, it is adjusted, for example, by means of the tilting mirror 9, onto the processing point B.

The nozzle 13 is provided only for cutting and is therefore fastened by means of a hinge 35 on the processing head so that it can be folded away together with its cutting lens 14 in order to allow joining by means of the same processing optics, with the exception of the cutting lens, i.e., to perform welding by means of laser radiation. The nozzle 13 can also be removable. In the joining situation, after-focusing by means of the cutting lens 13 is not required, and the focal point TCP is positioned in the position 37, for example, 130 mm in front of the center of the mirror 9 or its tilting axis 9'.

Figure 1:
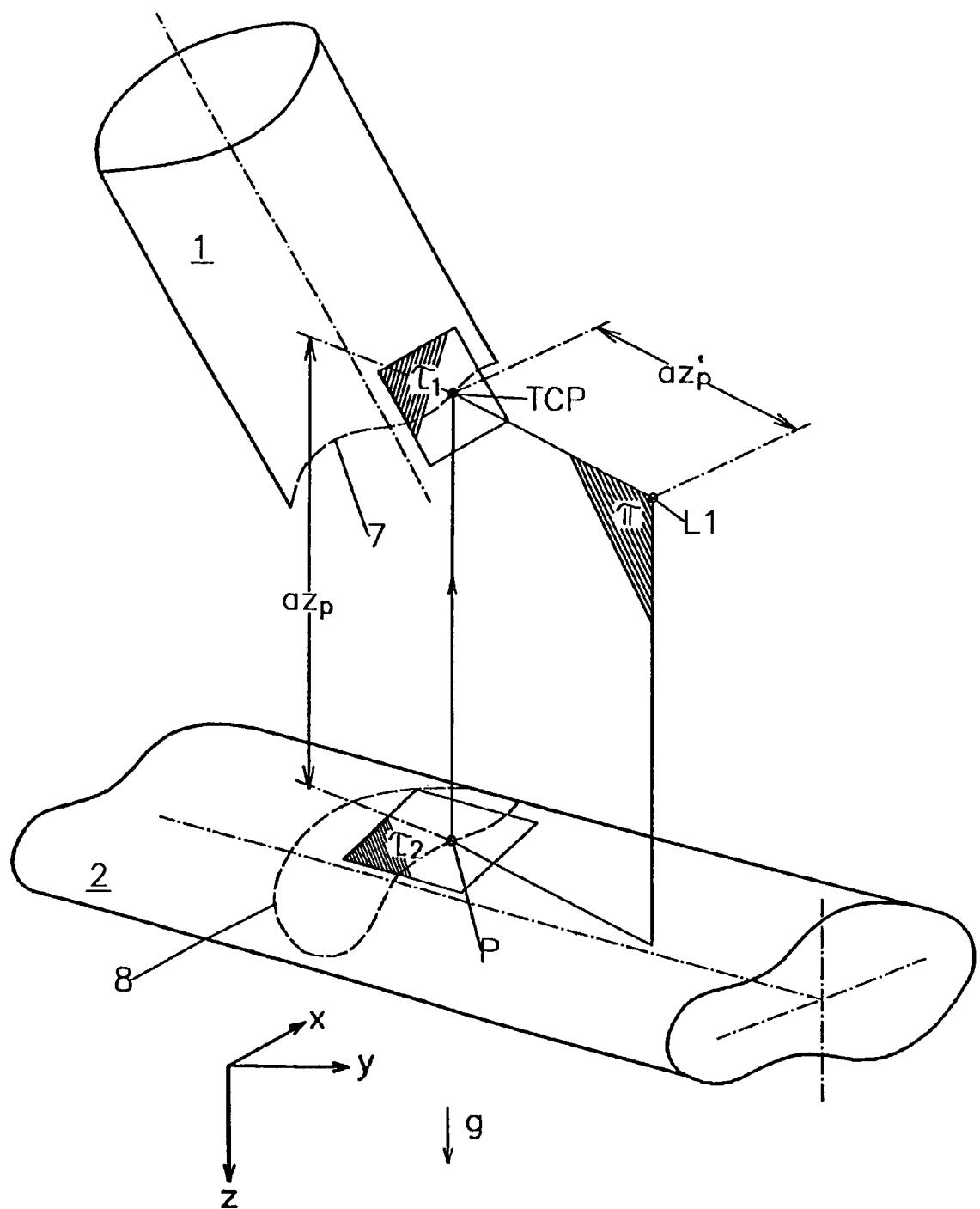
FIG. 1 a perspective schematic illustration of two workpieces for illustrating the geometric parameters important for the invention.

With the afore described buckling arm robot, at least one workpiece 1 is to be cut such that it can be joined with a workpiece 2. In FIG. 1, two tubular workpieces 1, 2 of a random cross-section are illustrated. Joining of the workpieces 1,2 is to be carried out wherein the workpiece 1 is to be joined with its end face to the outer circumference of the workpiece 2 in a seal-tight way. Component impressions and robot path impressions should not have any effect impairing the subsequent joining in an unacceptable way. For example, during welding by laser radiation a seam collapse is to be prevented. For this purpose, the workpiece 1 in the area of its end face should have a contour 7 that matches the outer contour of the workpiece 2. On this workpiece 2, the joining line 8 is illustrated that corresponds to this contour 7. The workpiece 1, after completion of its end face, starting from the position illustrated in FIG. 1 must be assembled in the direction g with the second workpiece 2. This circumstance is used in that the first workpiece 1 in the vicinity of the second workpiece 2 is arranged in a position in which the contour 7 can be produced. Cutting is carried out with the laser radiation 11 that has a focal point TCP on the workpiece 1. In FIG. 4, at the upper right corner, the control area of cutting is schematically illustrated. The beam focusing position can be changed in the z' direction and in the y direction. In the y direction, $\Delta y_{max}$ for the illustrated partial section 11' of the laser beam 11 of, for example, 1.5 mm results. In the z' direction, the focal point TCP can also be moved by +/−1.5 mm. With a sufficiently good beam quality, the focusing position adjustment in the z' direction is not necessary. The illustration at the top to the left shows that in the area of +/−1.5 mm no beam widening occurs that would result in an unacceptable enlargement of the cut gap because it can be corrected computationally, if needed. The two upper configurations of FIG. 4 illustrate that laser radiation at high radiation quality can be used so that a narrow focusing action is enabled.

FIG. 1 shows that the focal point TCP has a spacing $az_P$ from the surface of the workpiece 2 in the direction g of assembly of the two workpieces 1, 2. When all focal points TCP of the contour 7 in the direction g of the assembly of the two workpieces 1, 2 have the same spacing $az^P$ from the surface of the workpiece 2, the desired optimal adaptation of the contour 7 to the outer circumference of the workpiece 2 can be achieved. As a result of this, it is possible to carry out the method such that, when cutting the contour 7 of the first workpiece 1, it is always taken care that the spacing of the focal point TCP or of the corresponding processing point from the second workpiece 2 is identical to the predetermined spacing $az_p$ in the distance direction z oriented identically. The distance direction z is always adjusted to the direction g of assembly, i.e., is parallel thereto.

In order for the spacing $az_P$ of the focal points TCP from the second workpiece 2 to be maintained at a constant value during cutting, the spacing $az_P$ must be measured. This measurement must be repeated so often that the above mentioned path precision is within the range of +/−0.05× sheet metal thickness. The configuration of the surface of the second workpiece 2 has an effect on the measuring result and likewise the configuration of the surface of the first workpiece 1, inasmuch as it is not planar and arranged in a position in which the spacing of the workpiece 1 from the processing optics remains unchanged. Only in the latter case it is sufficient to measure exclusively the spacing $az_P$ of the focal point TCP from the second workpiece 2 in order to keep it constant during cutting. In all other cases, it is required to perform a repeated measurement of a spacing $az'_p$ that an element of the processing optics or a focusing element L1 has from the first workpiece 1. This spacing must then be kept constant. For maintaining the aforementioned conditions, an idealized auxiliary gear illustrated in FIG. 2 can be provided in which, aside from the two workpieces 1, 2, the axis of rotation 10 of the robot hand is illustrated as well as two sensors A, C for measuring the distance. These sensors A, C can be contactless measuring components but also tracing devices or even rollers, if the robot is so programmed that it presses simultaneously against both workpieces 1, 2. In this connection, pneumatic or hydraulic cylinders are used. For machining workpieces made of sheet steel, having a wall thickness of less than one millimeter, this is not suitable for obtaining the required path precision values.

It is therefore expedient to position contactless sensors A, C to be controlled by a parallelogram. A guide bar parallelogram 3, 4, 5, 6 is comprised of a pair of arms pz, pzp and an additional pair of arms pz', pz'p. The arms of these arm pairs are parallel to one another, respectively, and two arms, respectively, form a pivot point 3 and 4 and 5 and 6, wherein the pivot point 3 with regard to the thermal processes in the area of the focal point TCP is configured as a distance-keeping shell construction which is able to secure the sensor A at a predetermined spacing 16. In the area of the lower arm pz'p, the sensor C is arranged also at predetermined spacing 17 from the workpiece.

The parallelogram is configured such that its upper arm pz' is arranged in an incidence direction z' of the laser beam 11 or of the longitudinal axis of the sixth axis 10. Along this axis 10, the laser beam is supplied in the incidence direction z' by using a focusing element L1 and is focused onto the focal point TCP. Relative to the y-z plane, the guide bar parallelogram defining a parallelogram plane n has an adjusting angle α relative to the y-direction. Even though, the incidence direction is identified with z' because this matches most closely a regular referencing scheme of a person skilled in the art. The positioning of the guide bar parallelogram 3, 4, 5, 6 with an incidence angle α is predetermined by the robot control on the basis of CAD data. In this connection, it is taken into consideration primarily that the incidence direction z' of the laser beam 11 is parallel to a tangential plane T2 which is defined at a foot point P of the focal point TCP on the second workpiece 2. In this connection, the foot point P and the focal point TCP are related to one another by the distance direction z. The angle α must be readjusted depending on the configuration of the workpiece 2 when the position of the tangential plane T2 changes. Such a readjustment does not lead to a change of the alignment of the arm pz carrying the sensor C because of the parallelogram behavior of all parallelogram arms.

Figure 2:
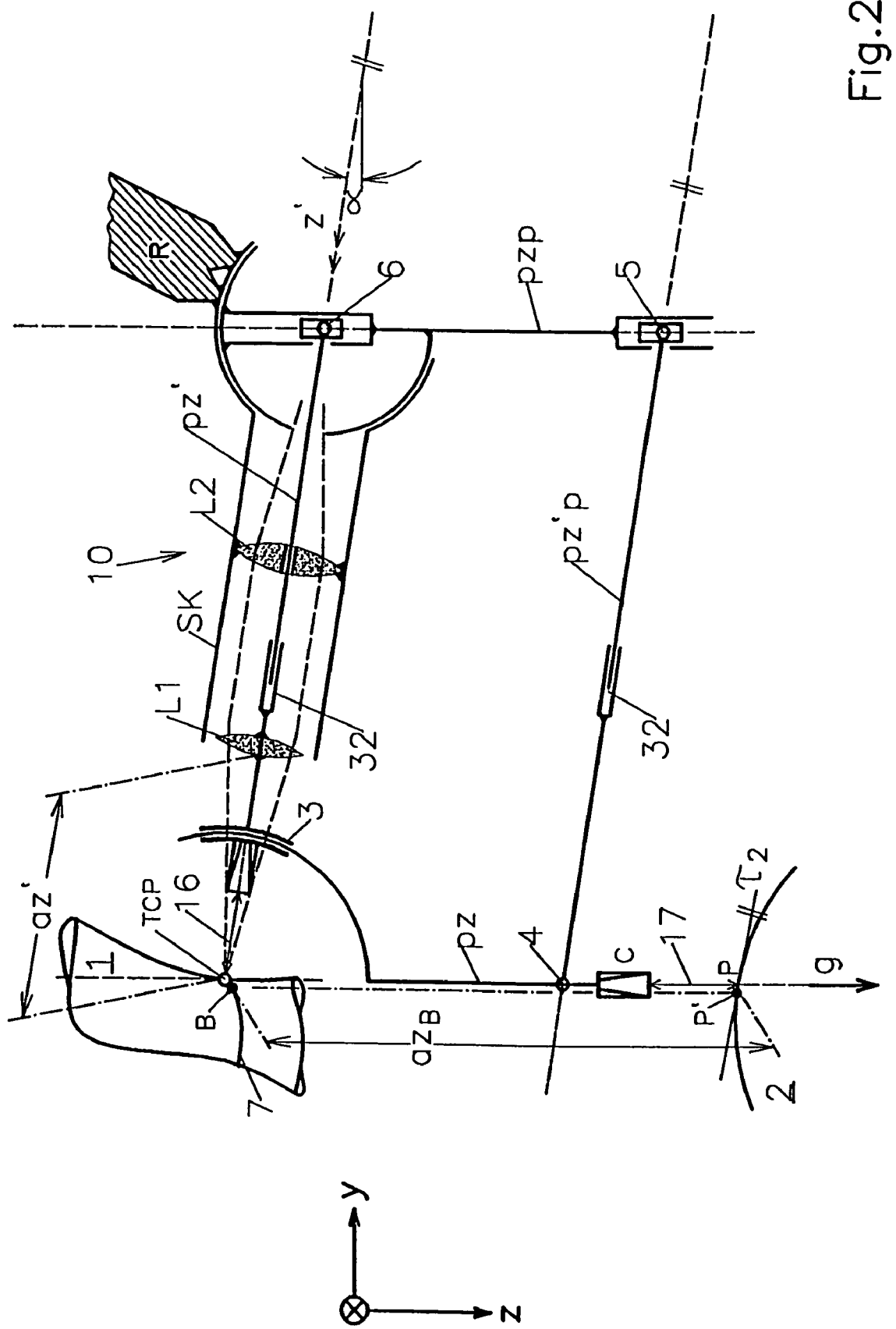
FIG. 2 a principal illustration of a parallelogram arrangement in connection with a robot hand shown in a partial schematic illustration.

In the case that the tangential plane T2, as a result of the configuration of the outer circumference of the workpiece 2, is not vertical to the plane of illustration of FIG. 4, but positioned at an angle thereto, the axis of rotation 10 can be rotated about z' so that the guide bar parallelogram 3, 4, 5, 6 is moved into a corresponding angle position relative to the illustration plane of FIG. 2.

In addition, it must be taken care of that the incidence direction z' of the laser beam during cutting is always perpendicular to a line of interception of an y-x plane with the tangential plane T2 extending through the focal point TCP. This contributes to a minimization of the cutting length in the wall of the workpiece 1 and increases the precision.

In accordance with the measured result of the sensor C, the spacing $az_P$ of the focal point TCP or of a corresponding processing point B from the workpiece 2 is maintained at a constant value, i.e., the spacing $az_P$ between TCP and P in FIG. 1 or a spacing $az_B$ in FIG. 2. However, for this purpose, the robot hand or the sleeve of the cutting head SK of the buckling arm robot or of a Cartesian robot having at least four axes must not be moved. It is sufficient instead to control the guide bar parallelogram 3, 4, 5, 6 such that the arm pz moves the sensor within the predetermined measuring path range away from or toward the workpiece 2. When the sensor is configured as a capacitive, contactless sensor, it can have a measuring path range of approximately 0.3 to 5 mm and a measurement in the direction z is carried out with a precision of approximately +/−10 μm.

The change of positioning of the guide bar parallelogram 3, 4, 5, 6 or of the incidence angle α is changed at the robot by means of a robot element R that adjusts the cutting head SK of the robot hand with a schematically illustrated ball-and-socket joint construction about the pivot point 6 so that the position is changed in accordance with the incidence direction z'.

A change of the spacing $az_P$ of the focal point TCP from its foot point P for a three-dimensional configuration of the workpiece 1 causes the focal point TCP to be no longer positioned on the workpiece surface. A readjustment must be carried out for which purpose the sensor A is employed that measures the spacing from the workpiece precisely in a range of +/−40 μm. According to this measured result, the focal point TCP can then be adjusted. For this purpose, it is not the robot hand that is moved but only a focusing element L1 or its holder so that in this way the focal point TCP is moved correspondingly. FIG. 2 shows the slide couplings 32 in the arms pz', pz'p for moving the focusing element L1.

The required adjusting speeds result from the own frequency of the robot to approximately 0.02 m/sec. The measurements and the readjustments are performed in soft real time with more than 40 Hz in comparison to conventional adjusting frequencies of robots with 8 to 15 Hz. The adjusting strokes of the axes are approximately +/−1.5 mm. An advancing stroke of a sensor measuring point in front of a processing point B or the focal point TCP is, for example, 0.1 mm for a signal evaluation speed of one kHz and 6 m/min cutting speed at the first workpiece 1. When eliminating an advancing action, only a very small error in the saddle range will result. The described adjustment of the focal point TCP requires an absolute dimension of the direction z—this is the described direction g—with which the workpieces 1, 2 are moved toward one another for the purpose of welding after scrap removal. This direction g can be predetermined by a gyrocompass or by two gyrometers with which +/−0.007°, rather than the aforementioned +/−0.023° of the buckling arm robot, can be achieved.

Figure 3:
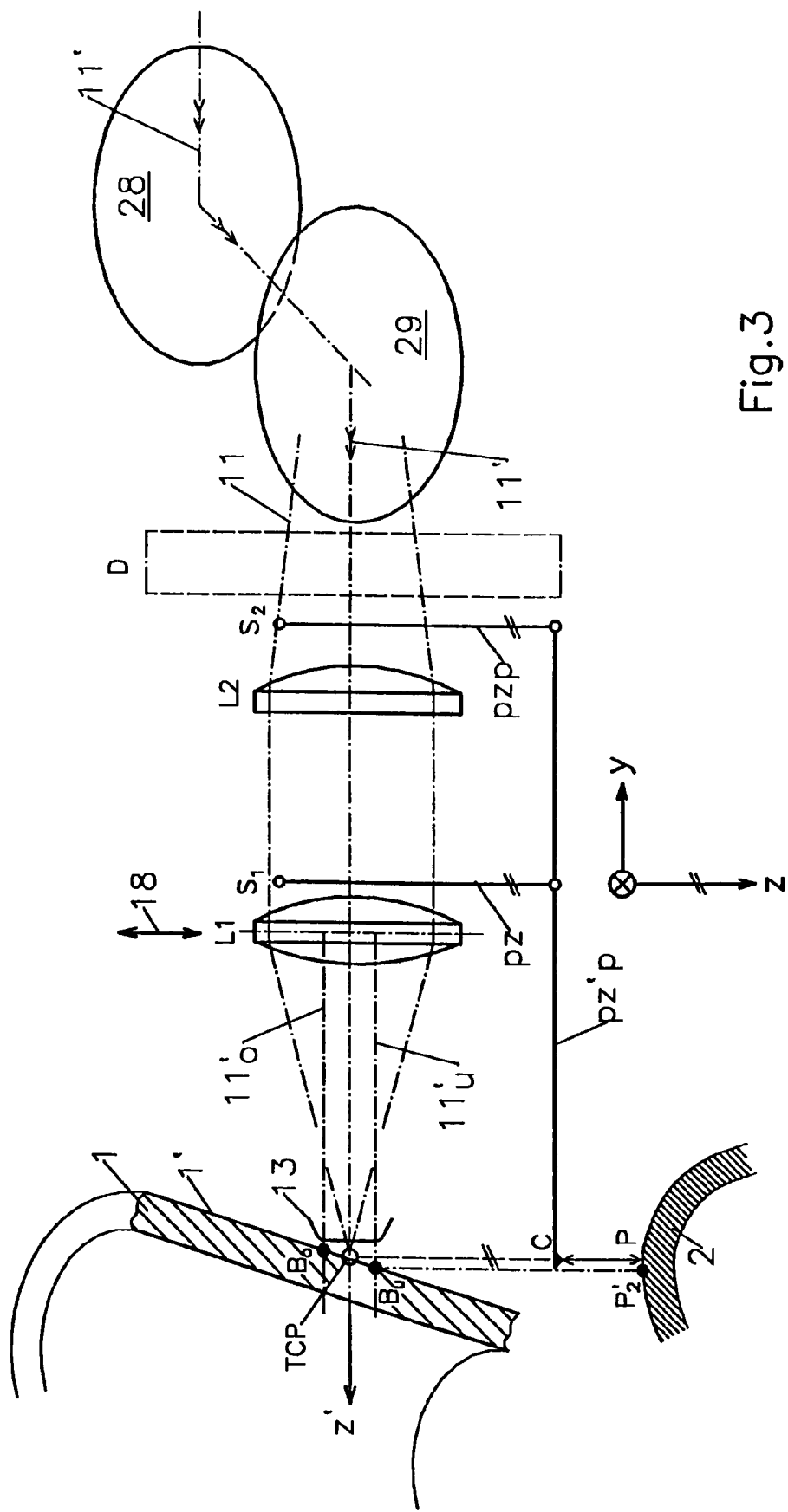
FIG. 3 a schematic of the configuration of an axis of rotation assembled with a guide bar parallelogram.

FIG. 3 shows a configuration of a processing optics suitable in particular for processing thick sheet metal. Laser radiation 11 is guided by mirrors 28, 29 of the fifth robot axis onto a beam path 11' into a longitudinal axis of a processing optics which is arranged on the sixth robot axis. This sixth robot axis of the robot hand is a hollow shaft of rotation D that is only schematically indicated. The longitudinal axis of the processing optics is directed onto the first workpiece 1 for an incidence angle α=0 in the incidence direction z', and the focal point TCP is generated on the wall surface 1' at the robot hand.

The generation of the focal point TCP is realized with a focusing element L1 to which the laser radiation 11 is supplied by means of a collimator L2. The focused laser radiation 11 exits from the processing optics through a slotted hole nozzle 13 whose longitudinal direction is to be envisioned in the plane of the illustration. The shaft of rotation D is able to rotate the processing optics including the slotted hole nozzle 13 such that a guide bar parallelogram, still to be described, can be rotated into and maintained in any y-z plane. The y-z plane then corresponds to the z-z' plane. With the afore described processing optics the caustic surface, illustrated in FIG. 4 at the left upper corner, can be produced that is suitable for cutting 1.5 mm thick sheet steel when a 2.2 kW diode-pumped solid-state laser having a cutting speed of approximately 2 m/min is used. In order for the focusing shape or the caustic surface to be as narrow as possible in the incidence direction z' in order to be particularly suitable for cutting, the optical path should be as long as possible. For this reason, in the processing head of the robot hand two 90° beam deflection devices are provided, see FIG. 4.

The focusing element L1 is moveable linearly in a direction perpendicular to the laser beam axis 11' or z' within the plane of the drawing; see the double-headed arrow 18. In this way, it is possible to displace the laser beam 11 in FIG. 3 to the top and to the bottom. The displacement is illustrated in FIG. 3 be means of the upper beam path section $11'_O$ and by means of the lower beam pass section $11'_U$. The displacement is +/−1.5 mm perpendicularly to z'. In this way, the processing points $B_O$ and $B_U$ result.

The sensor C is always oriented toward P or the vicinity of P wherein the directions TCP-P, that of the arms pz and pzp, and the directions z or g are always parallel to one another. The use of the sensor C can be maintained as a result of the use of the arm pz'p in the vicinity of the foot point P. The sensor C can also be mounted in a displaced fashion within the z-y plane. In this case, triangulation computation is required.

In order to maintain the sensor C within the vicinity of the workpiece 2, i.e., in the vicinity of the foot point P in the z direction, it is positioned by parallelogram control. For the parallelogram control, the lower parallelogram arm pz'p is provided which is parallel to the upper parallelogram arm that is formed by the shaft of rotation D. It corresponds to the parallelogram arm pz' in FIG. 2. The lower arm pz'p is suspended by means of two parallelogram arms pz and pzp that are parallel to one another on the axis of rotation. The suspension is realized at a pivot point $S_1$ and $S_2$ which are mounted parallel to the z-y plane at different levels. In this way, corresponding constructional degrees of freedom result. The length and orientation of pz and pzp in FIG. 3 is identical; however, their joints $S_1$ and $S_2$ can be mounted at different levels. The guide bar parallelogram can be controlled by a parallel drive (not illustrated) about the pivot points $S_1$, $S_2$ such that the sensor is positioned, at least in the saddle area, at +/−2° perpendicularly to the surface of the workpiece 2, but always precisely within the z-y plane corresponding to the base coordinate system of the robot that is independent of the adjusted incidence angle α of the hand axis.

The measured values of the sensor C, the determined spacings $az_P$ of the focal point TCP from the second workpiece 2 or from the foot point P positioned thereon, serve for controlling the lens L1. The lens deflects the laser beam 11 onto a processing point B of the processing area Bo to Bu of the z-y plane. In this way, the spacing $az_B$ is adjusted to a constant value. In addition, for example, by means of a distance sensor arranged at the tip of the nozzle 13, the distance in the incidence direction z' can be measured. By employing a table saved in a computer, cutting gap width correction as a function of the focal point position relative to the workpiece 1 can be performed in that the processing point B is corrected by controlling the lens L1.

The use of only one measuring value $az_P$ is too imprecise in order to achieve a greater path precision than 0.1 mm at 1 mm sheet metal thickness for the spacing $az_B$ in the z direction. This holds true also when the curvature at the foot point P from the known CAD data is included in the calculation of the spacing $az_B$. For +/−0.4 mm positional uncertainty of the robot in the y direction and for +/−0.3 mm shape uncertainty in the case of pipes shaped by internal high-pressure transformation (IHT pipes), the error would be 0.7 mm for an incidence angle of 45°. With a curvature table and a measuring sensor A at the tip of the nozzle 13, the error would be approximately +/−0.3 mm for a radius of curvature of 25 mm of the workpiece 2 in the z-y plane, plus minimal mechanical errors and minimal control errors. As a result of this, the described device is essentially suitable only for machining components having thick walls or for T-joining an almost plane workpiece 2 and a workpiece 1. When the device is to be used also for other purposes, additional measures are required in order to improve the dimensional accuracy of the method.

A significant improvement of the measuring and adjusting precision can be achieved in that, in addition to determining the spacing $az_P$, the curvature of the workpiece 2 that it has at the foot point P in the respective z-y plane is determined. If the workpiece 1 is three-dimensional, in particular, tubular, such a determination can be carried out additionally also on the workpiece 1. Possibilities for determining the curvature of the workpieces 1, 2 at the foot point P or at the focal point TCP reside in that in their vicinity light markings that are within the parallelogram plane are generated and measured. Such light markings can be employed as dots or strips. Dot markings can be generated, for example, by means of light guide fibers by means of which these dots are projected. Light strips can be produced by scanning.

For a curvature measurement on the workpiece 2, three dots are projected by means of three fibers. The measuring spacing is short because of the suspension of the lower sensor C at the lower arm pz'p. A white light sensor (laser microscope) can be used in this connection which transmits three "images" to three spectrographs that are used with approximately 1 kHz/measurement recording. If the workpiece 2 is comprised of lightly oiled, galvanized material, an optical diameter at the front of 12 to 15 mm, a measuring spacing of approximately 20 mm via two mirrors from the sensor output, and three measuring dots with 1.5 mm spacing at a diameter of 30 µm are feasible; the measuring error that can be achieved is then is +/−10 µm.

For a curvature measurement on the workpiece 1, a measuring laser as a part of the upper sensor A is used. The measuring laser overlays the laser beam with a measuring beam that has a much more intensive focus than the laser beam. The measuring beam diameter is approximately 40 µm with a luminous power of 30 mW and a wavelength of 675 nm+/−5 nm. The luminous power is in any case 20 mW and the wavelength range is 500 to 1,000 nm. As a result of this, the power density of the measuring beam is higher in a narrow wavelength window than the process radiation, for example, the reflective radiation on a leading cut edge or that of a welding keyhole. It is also possible to mask the process radiation in that in the beam path of the reflected light radiation two cut-off filters are used. In this way, the process radiation or the keyhole can be masked by means of an aperture or by means of an intensity threshold via a computer. A single sensor unit for cutting and for the required seam monitoring during welding is sufficient.

The laser measuring beam is guided coaxially to the laser beam through the slotted hole nozzle. In this way, an incident angle suitable for reflection is achieved in all positions of the axis of rotation D relative to the workpiece 1. In this way, slipping incident angles of the laser measuring beam can be prevented which can lead to bad reflection properties for galvanized materials.

In order to increase the dimensional accuracy for cutting even more, it is expedient when the measuring and control process is realized with soft real time with more than 40 Hz. This holds true, in particular, when the processing point B in the distance direction z is displaced by more than 20 µm. It is then practical that the measuring and control process is realized in soft real time with more than 50 Hz. For a sensor measuring the workpiece 2, up to 250 Hz can be achieved. When three independent sensors are used, it is also possible to achieve measuring and control frequencies of up to 1 kHz.

Moreover, it is advantageous to obtain adjustments of the sensors as precise as possible. The relatively slow rotational adjustment of the guide bar parallelogram 3, 4, 5, 6 in the z direction can be achieved with an encoder that, for a rotary range of approximately +/−45°, has a precision of +/−0.01°. For the adjustment of the optical elements arranged in the beam path of the laser radiation, a very precise encoder is advantageous. When this element is configured as a tilting mirror 9 for fast adjustment of the processing point B, a rotary range of approximately +/−0.45° for an angular precision of +/−0.005° is required; up to +/−$10^{-4°}$ can be realized.

Cutting of the workpiece 1 can be observed with a camera in order to evaluate the light markings. For this purpose, for example, the lateral flanks of the slotted hole nozzle 13 are outwardly so steep that the camera can view the entire control area in the incidence direction z' for an incidence angle α=40°. The camera is, for example, a CMOS camera and has as an evaluation optics a depth-of-field optics so that precise measuring results can be obtained. By means of the measured results on the workpiece 1 for all provided incidence angles α, the curvature circles present at the workpiece 1 can be computed. The curvature circles, for example, are calculated based on four points wherein the center between the outer points is used as a spacing from the part 1. The camera can be aligned with the camera center such that the center of the laser beam and all measuring points are positioned on a line of the camera, respectively, so that the CMOS camera can evaluate quickly.

After cutting, the workpiece 1 is assembled together with the workpiece 2 in the direction g. The assembly is carried out exactly such that the focal point TCP is positioned on its foot point P. Subsequently, joining of the two workpieces 1, 2 is carried out. The contour of the workpiece 1 is so well matched to the outer circumference of the workpiece 2 that only minimal spacing gaps result that do not affect the joining results. For example, no or only an acceptable seam collapse occurs when welding is carried out.

In order to obtain a minimal spacing gap, the workpiece 1 is cut such that the cut surface is as parallel as possible to the tangent at the foot point P or has a predetermined deviation thereto. For this purpose, cutting of the workpiece 1 is carried out at a predetermined bevel angle; the above said applies here. When welding, the upper sensor A can be used as a seam tracing sensor. By means of the camera, it is possible to monitor whether the produced seam corresponds to the course of the cutting path, and, if needed, a correction can be achieved, for example, by moving the lens L1.

The processing point B can trail the focal point TCP at a predetermined distance. For a cutting velocity of 2 m/min, it can trail by ⅓ mm in the measuring plane z-y when the computing and adjusting time is 1/300 sec. The trailing action of the processing point relative to the measuring plane z-y can be adjusted by means of a mirror, for example, by means of the mirror 9 of FIG. 4. For this purpose, it can be configured such that, in addition to its adjustment in the plane z-z', it can also be foldable from the illustrated position into two positions of the plane x-z' in order to enable advance movement or trailing movement.

What is claimed is:

1. A method for robot-controlled cutting of workpieces to be joined by laser radiation, the method comprising the steps of:
    arranging a first workpiece in vicinity of a second workpiece in a first position;
    focusing a laser onto the first workpiece;
    cutting with the laser beam a contour of the first workpiece, which contour is to be assembled and joined with the second workpiece;
    during cutting, repeatedly determining a first spacing of a focal point of the laser beam from the second workpiece in a distance direction that is identically oriented during cutting and is adjusted to a direction of assembling the first and second workpieces; and
    during cutting, maintaining a second spacing of a processing point of the laser beam from the second workpiece at a constant value.

2. The method according to claim 1, further comprising, during cutting, additionally the steps of repeatedly measuring a third spacing of an element of a processing optics from the first workpiece and maintaining the third spacing at a constant value.

3. The method according to claim 1, wherein the first spacing is measured directly, wherein the processing point corresponds to the focal point, and wherein the constant value of the second spacing is adjusted, as needed, by taking into consideration a curvature of at least one of the first workpiece and the second workpiece.

4. The method according to claim 2, wherein at least one of the first spacing and the third spacing is measured by at least one sensor.

5. The method according to claim 4, wherein the at least one sensor is a contactless sensor.

6. The method according to claim 5, wherein the third spacing is measured in an incidence direction of the laser beam.

7. The method according to claim 4, wherein the at least one sensor is a tracing sensor or a roller sensor.

8. The method according to claim 2, wherein at least one of the first spacing and the third spacing is determined by a measuring device employing a light marking selected from the group consisting of at least three light dots arranged in one measuring plane and a light strip arranged in one measuring plane.

9. The method according to claim 8, further comprising the step of aligning a center between the light dots or a center of the light strip, respectively, with the focal point and with a foot point of the focal point projected in the distance direction.

10. The method according to claim 8, further comprising the steps of generating the light marking with a measuring beam of a measuring laser and evaluating light reflected by the light marking with regard to a curvature of at least one of the first workpiece and the second workpiece by employing a depth-of-field camera optics.

11. The method according to claim 10, wherein at least one measure is employed for determining the first and second spacing, wherein the at least one measure is selected from the group consisting of a) an intensity of a measuring radiation of the measuring beam surpasses that of a laser radiation of the laser beam and b) a processing light is masked.

12. The method according to claim 10, wherein maintaining the constant value of the second spacing is realized in soft real time with more than 40 Hz, when a displacement of the processing point of more than 28 pm occurs in the distance direction.

13. The method according to claim 12, wherein maintaining the constant value of the second spacing is realized in soft real time with more than 50 Hz.

14. The method according to claim 1, further comprising the step of placing the processing point onto a wall surface of the first workpiece, wherein the wall surface faces away from the laser beam.

15. The method according to claim 4, wherein at least the sensor measuring the first spacing is adjusted by a parallelogram control, wherein a first parallelogram arm and a second parallelogram arm of the parallelogram control extending parallel to one another are kept parallel in the distance direction.

16. The method according to claim 15, wherein the parallelogram control comprises a third parallelogram arm and a fourth parallelogram arm extending parallel to one another, wherein one of the third and fourth parallelogram arms is positioned along an incidence direction of the laser beam.

17. The method according to claim 16, wherein the incidence direction of the laser beam is positioned parallel to a tangential plane extending through a foot point of the focal point or is positioned at a predetermined bevel angle at least in the saddle area of the workpieces.

18. The method according to claim 16, wherein the incidence direction of the laser beam is positioned parallel to a tangential plane extending through a foot point of the focal point and at a predetermined bevel angle at least in the saddle area of the workpieces.

19. The method according to claim 16, further comprising the step of adjusting the incidence direction of the laser beam with a precision of +/−2°.

20. The method according to claim 16, wherein the incidence direction of the laser beam during cutting is always perpendicular to a line of interception of an x-y plane with a tangential plane extending through the focal point.

21. The method according to claim 16, wherein, in the step of maintaining the second spacing at a constant value, the constant value of the second spacing is achieved by controlling an optical element in a beam path of the laser beam.

22. A device for robot-controlled cutting of workpieces to be joined by laser radiation, wherein a first workpiece is arranged in vicinity of a second workpiece in a first position; a laser is focused onto the first workpiece; a contour of the first workpiece is cut with the laser beam, which contour is to be assembled and joined with the second workpiece; during cutting, a first spacing of a focal point of the laser beam from the second workpiece is repeatedly determined in a distance direction that is identically oriented during cutting and is adjusted to a direction of assembling the first and second workpieces; and, during cutting, a second spacing of a processing point of the laser beam from the second workpiece is maintained at a constant value; the device comprising:

a laser producing a laser beam for cutting a first workpiece;

a control for controlling the laser beam, the laser beam having a focal point and a processing point on the first workpiece;

a first sensor for measuring during cutting a first spacing of the focal point from a second workpiece in a distance direction;

wherein the processing point of the laser beam formed on the first workpiece has a second spacing maintained constant relative to the second workpiece in the distance direction that is identically oriented during cutting and is adjusted to a direction of assembling the first and second workpieces.

23. The device according to claim 22, further comprising a guide bar parallelogram configured to align the first sensor, wherein the guide bar parallelogram has first and second parallelogram arms aligned in the distance direction and third and fourth parallelogram arms aligned in an incidence direction of the laser beam.

24. The device according to claim 23, further comprising a second sensor arranged on an upper one of the third and fourth parallelogram arms, wherein the laser comprises a processing optics having a processing element, wherein the second sensor is configured to measure a third spacing of the processing element of the processing optics relative to the first workpiece.

25. The device according to claim 24, wherein the robot has a robot hand with a shaft of rotation, wherein the upper parallelogram arm is formed by the shaft of rotation of the robot hand.

26. The device according to claim 25, wherein a lower one of the third and fourth parallelogram arms is arranged parallel to the shaft of rotation and is fastened to the shaft of rotation bathe first and second parallelogram arms in a pivotable and drivable way.

27. The device according to claim 22, further comprising an optical element arranged in a beam path of the laser beam, wherein the processing point is movable with the optical element about a center position.

28. The device according to claim 27, wherein the optical element is a tilting mirror or a movable lens or is comprised of two prisms that are rotatable relative to one another.

29. The device according to claim 28, wherein the tilting mirror is adjustable into different positions of an x-z' plane for providing an advancing movement or trailing movement of the processing point.

30. The device according to 23, wherein a distance adjusting range of the focal point to the processing point is +/−1.5 mm in a parallelogram plane of the guide bar parallelogram.

31. The device according to claim 22, wherein the laser has a beam quality of k 0.35.

32. The device according to claim 22, wherein the laser produces a laser measuring beam coaxial to the laser beam and wherein the laser measuring beam has a wavelength range of 500 to 1,000 nm.

33. The device according to claim 22, comprising a measuring device operating with white light, wherein the first sensor belongs to the measuring device.

34. The device according to claim 22, forming a hand of a robot that is fastened by being suspended from an additional linear axis.

* * * * *